United States Patent [19]

Kluger et al.

[11] 4,321,353
[45] Mar. 23, 1982

[54] POLYCYCLOALIPHATIC POLYAMINES

[75] Inventors: Edward W. Kluger, Pauline; Tien K. Su, Spartanburg, both of S.C.

[73] Assignee: Milliken Research Corporation, Spartanburg, S.C.

[21] Appl. No.: 153,645

[22] Filed: May 27, 1980

Related U.S. Application Data

[62] Division of Ser. No. 850,502, Nov. 10, 1977, Pat. No. 4,226,737.

[51] Int. Cl.³ .............................................. C08G 59/50
[52] U.S. Cl. .................... 528/120; 528/119; 528/122; 528/123
[58] Field of Search ............... 528/119, 120, 123, 122; 252/182; 260/563 B

[56] References Cited

U.S. PATENT DOCUMENTS

| | | | |
|---|---|---|---|
| 2,935,488 | 5/1960 | Phillips et al. | 528/119 |
| 3,654,370 | 4/1972 | Yeakey | 260/584 B |
| 3,711,447 | 1/1973 | Fester et al. | 260/563 R |
| 3,714,120 | 1/1973 | Labana et al. | 528/120 |
| 3,945,953 | 3/1976 | Zondler | 528/123 |
| 3,954,650 | 5/1976 | Bliss | 528/124 |
| 4,026,858 | 5/1977 | Andrews et al. | 528/124 |
| 4,101,459 | 7/1978 | Andrews | 528/122 |
| 4,122,069 | 10/1978 | Meyer | 528/122 |

*Primary Examiner*—Allan Lieberman
*Attorney, Agent, or Firm*—H. William Petry; Terry T. Moyer

[57] ABSTRACT

Novel polycycloaliphatic polyamines are provided which have the structure

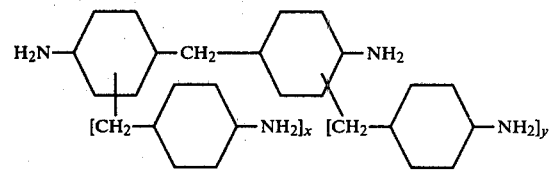

wherein x and y are integers of from 0 to about 2 and the sum of x+y is at least 1. Further, polycycloaliphatic polyamine curing agents for polyepoxide resins are provided wherein such curing agents are a reaction mixture consisting essentially of from about 50 to about 75 weight percent of a polycycloaliphatic polyamine represented by the structure

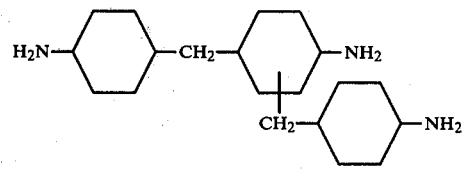

and from about 15 to about 30 weight percent of a polycycloaliphatic polyamine represented by the structure

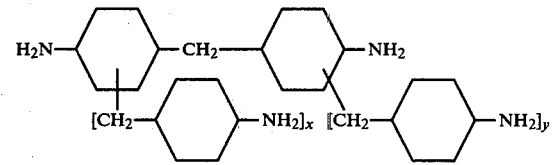

wherein x and y are integers of from 0 to about 2 and the sum of x+y is 2.

3 Claims, No Drawings

POLYCYCLOALIPHATIC POLYAMINES

This is a division of pending application Ser. No. 850,502, filed Nov. 10, 1977, and now U.S. Pat. No. 4,226,737.

This invention relates to novel chemical compositions. In one aspect it relates to novel polycycloaliphatic polyamines. In yet another aspect it relates to polycycloaliphatic polyamines useful as polyepoxide curing agents.

Chemical compositions, particularly novel chemical compositions, are constantly being sought by the chemical industry. Such chemical compositions are generally sought to improve properties of already existing chemical compositions, or as intermediates, to provide chemical compositions having improved physical, chemical, and/or toxicological properties. Heretofore, aromatic compositions have been employed in the production of numerous products, such as polyurethane foams, polyamides, and curing agents for resinifying polyepoxides. However, recently such aromatic structures or compounds containing same have become suspect as possessing toxicological properties which are believed hazardous to those working with or employing such compounds. Therefore, new and improved chemical compositions, including intermediate products, are constantly being sought which can be economically produced and do not possess suspect toxicological, and other undesirable properties. Further, with the wide use of polyepoxides, and the need of a curing or resinifying agent for such polyepoxides, new and improved epoxy curing agents are being sought which do not possess obnoxious odors, cause irritation to the skin of the operator, or possess other hazardous and/or toxicological properties. However, in obtaining new curing or resinifying agents for polyepoxides, the resulting products must have a sufficient hardness and strength, often at elevated temperatures, as have the prior art aromatic containing curing agents. In addition, it would be extremely desirable that the resistance of the cured products to water and solvents be substantial.

It is therefore an object of the present invention to provide novel chemical compositions which do not create toxicological problems for the processor or user of such compounds. Further, it is an object of the invention to provide new and improved curing or resinifying agents for polyepoxides which do not contain obnoxious odors, toxicological properties, and which do not sacrifice the desired hardness and strength of the cured product. These and other objects, advantages, and features of the present invention will be apparent to those skilled in the art from a reading of the followed detailed description.

According to the present invention, we have now discovered novel polycycloaliphatic polyamines which can be employed as intermediates for the production of polyurethane foams, polyamides, or, in certain instances, as polyepoxide curing and resinifying agents, which are economical to manufacture, do not possess undesired toxicological properties, and which, in most instances are equivalent or superior to the prior art compositions employed in such uses. Broadly, the present invention resides in novel polycycloaliphatic polyamines having the general structure

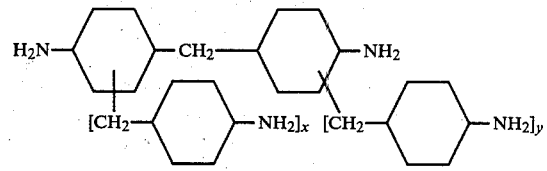

wherein x and y are integers of from 0 to about 2 and the sum, x+y, is at least 1. In one embodiment, polycycloaliphatic polyamine curing agents for polyepoxide resins are provided wherein such curing agents are a reaction mixture consisting essentially of from about 50 to about 75 weight percent of a polycycloaliphatic polyamine having the general structure

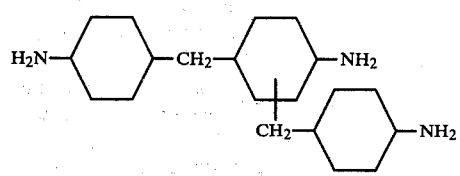

and from about 15 to about 30 weight percent of a polycycloaliphatic polyamine having the general structure

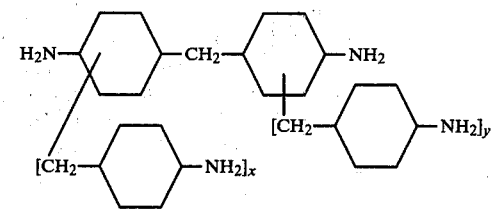

wherein x and y are integers of from 0 to about 2 and the sum of x+y is 2.

The novel polycycloaliphatic polyamines of the present invention can be produced by the hydrogenation of aromatic polyamines. Generally, such polycycloaliphatic polyamines are produced by the hydrogenation of a reaction mixture containing aromatic polyamines wherein the aromatic polyamine reaction mixture has been prepared by the reaction of aniline, methylene dianiline, and formaldehyde under acidic conditions. Typical of such a preparation of the reaction mixture of an aromatic polyamine is illustrated by Equation 1 below.

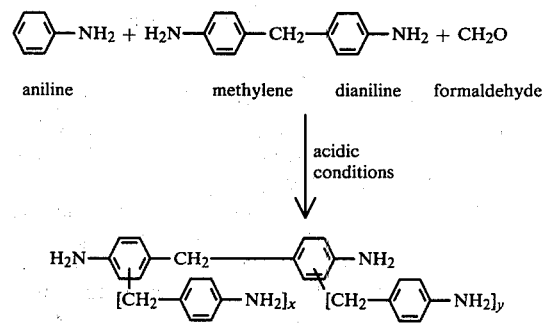

wherein x and y are integers of from 0 to 2 and the sum of x is at least 1, preferably from 1 to about 4.

The temperature and pressure at which the above described aromatic polyamines are prepared can vary widely. Further, any suitable acid catalyst capable of promoting the reaction to provide the desired aromatic polyamine mixture can be employed. Typical of such an acid catalyst is hydrochloric acid.

Once the desired aromatic polyamine constituent or admixture has been obtained, such can readily be hydrogenated, with hydrogen in the presence of a suitable hydrogenation catalyst to produce the desired polycycloaliphatic polyamines of the subject invention. Further, the hydrogenation reaction of the aromatic polyamines can be carried out in the presence or absence of a solvent. When a solvent is employed, any suitable solvent which will not interfere with the desired hydrogenation can be employed, such as cycloaliphatic ethers, e.g., dioxane, tetrahydrofuran, and the like and higher boiling alkanes, e.g., hexane, cyclohexane, heptane, decane and the like. However, it should be noted that low molecular weight alcohols cannot be employed as a solvent in the hydrogenation step as such alcohols cause alkylation to occur.

The amount of catalyst employed in the hydrogenation reaction can vary widely. However, generally the amount of catalyst employed will vary from about 0.01 to about 30 weight percent, preferably from about 0.5 to about 5 weight percent. The temperature at which such hydrogenation occurs can likewise vary widely. Generally, it is desirable that the hydrogenation be carried out at a temperature of from about 50° C. to about 300° C., more desirably, from about 125° C. to about 175° C. Another factor to consider in the hydrogenation of the aromatic polyamines to the desired polycycloaliphatic polyamines is the hydrogen pressure. Generally, the reaction can readily be carried out when the hydrogen pressure employed is from about 100 psi to about 5000 psi. However, more desirably, the hydrogen pressure will be from about 1500 psi to about 2500 psi.

As in all chemical reactions, time is a factor, such being that time required to allow the reaction to go to substantial completion. Generally, the above described hydrogenation reaction can occur within a time period of from about 15 to about 20 hours, preferably from about 10 to about 15 hours.

The hydrogenation catalyst employed in the hydrogenation of the aromatic polyamines to the desired polycycloaliphatic polyamines of the present invention can be any suitable hydrogenation catalyst, and such catalyst can be either in its free mantle, oxide, or salt state, and further such catalyst can be extended on a suitable support, such as alumina, silica, kieselguhr, and the like. Typical of such hydrogenation catalyst are ruthenium, rhodium, osmium, iridium, and the like.

To illustrate the formation of the polycycloaliphatic polyamines of the present invention by the hydrogenation of aromatic polyamines the following reaction is set forth. However, it is to be understood that the reaction is a typical reaction in the production of the polycycloaliphatic polyamines of the present invention and the particular products sought will be dependent, to a large extent, upon the initial structure of the aromatic polyamine employed in the hydrogenation step.

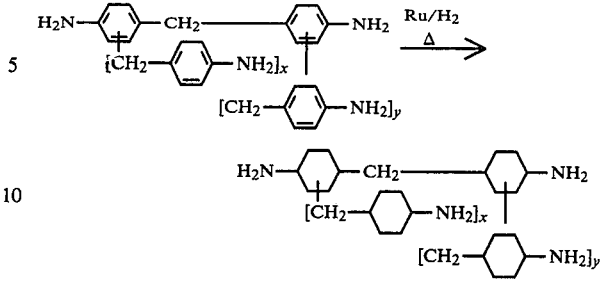

wherein x and y are each integers of from about 0 to about 2 and the sum of x+y, in each instance, is at least 1, preferably from 1 to about 4.

When the polyaromatic polyamine reaction mixture is formed as a result of the reaction of aniline, methylene dianiline and formaldehyde under acid conditions, and such reaction mixture is hydrogenated with hydrogen in the presence of a hydrogenation catalyst, a reaction mixture of polycycloaliphatic polyamines illustrated above, will generally occur. While the particular isomer distribution of the polycycloaliphatic polyamines formed by such a reaction can vary widely, generally it has been found that the polycycloaliphatic polyamine admixture will contain from about 50 to about 75 weight percent of a polycycloaliphatic polyamine represented by the structure

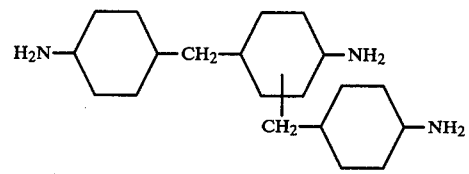

from 15 to about 30 weight percent of a polycycloaliphatic polyamine represented by the structure

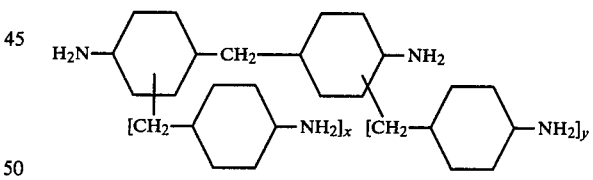

wherein x and y are integers of from 0 to about 2 and the sum of x+y is 2 and minor amounts of higher and lower substituted polyamines. Further, as will be set forth in more detail hereinafter, polycycloaliphatic polyamines resulting from the hydrogenation of the above described reaction admixture of aromatic polyamines have especially desirable utility as an epoxy curing agent.

The polyepoxides which can be cured at elevated temperatures using the polycycloaliphatic polyamines as herein described are those polyepoxides possessing at least two

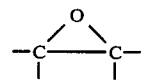

groups. These groups may be terminal, i.e.,

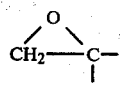

groups or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art. The curing of the polyepoxides with the above-described polyamine cycloaliphatic curing agents of the present invention may be accomplished by mixing the two components together. While the reaction between the two components occurs slowly at room temperature, improved results can be obtained if the mixture is heated to a temperature of from about 50° C. to about 280° C. for a period of time of from about 1 to about 12 hours and thereafter post curing the reaction product for an additional period of time of from about 1 to about 8 at a temperature of from about 140° C. to about 225° C. With small casting, curing of the reaction mixture can be obtained by heating the reaction mixture for about two hours at a temperature of from about 80° C. to about 100° C. and thereafter post curing the reaction product at a temperature of from about 140° C. to 225° C. for an additional two hours or so.

The amount of the polyamine substituted cycloaliphatic compound employed as the curing agent in the cure of the polyepoxide may vary widely. However, the amount of such curing agent will generally range from about 5 part per 100 parts of polyepoxide up to about 50 parts per 100 parts of polyepoxide. Especially desirable results are obtained when the curing agent is employed in amounts varying from about 10 to about 40 parts per 100 parts of polyepoxide.

In curing polyepoxides, it is generally desirable that the polyepoxide be in a mobile condition when the curing agent is added to insure uniform mixing. If the polyepoxide is extremely viscous or solid at room or casting temperature, the polyepoxide may be heated to reduce the viscosity or a volatile liquid solvent which can escape from the polyepoxide composition containing the polyamine cycloaliphatic curing agents by evaporation before and/or during the curing of such polyepoxide-polyamine cycloaliphatic compositions can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ether of ethylene glycol and chlorinated hydrocarbons, such as chloroform.

Thus, the novel polycycloaliphatic polyamine of the present invention can be used, per se, as the curing agent for polyepoxides. However, such polycycloaliphatic polyamine curing agents can also be blended with aliphatic, cyclic, or linear polyamine in varying amounts to provide improved epoxy curing agents. The amount of the polycycloaliphatic polyamine curing agent employed in combination with such aliphatic, cyclic, or linear polyamine compounds will generally be from about 5 to about 90, preferably from about 10 to about 80 weight percent.

The novel polycycloaliphatic polyamines of the present invention can also be cyanoethylated or subjected to numerous other chemical reactions thus showing that such polycycloaliphatic polyamines are useful intermediates in the production of numerous compounds, such as adducts for polyurethane foams and polyamides.

In order to more fully describe the preparation and use of the novel polycycloaliphatic polyamines of the present invention the following examples are given. However, such examples are presented for illustrative purposes only and not to be construed as unduly limiting the scope of the present invention. Unless otherwise indicated, all parts and percentages in the examples are by weight.

EXAMPLE 1

In a 1000 cc rocking autoclave was placed 35 gm of a commercial available aniline-methylenedianiline-formaldehyde condensate, such being formed by the reaction of aniline, methylene dianiline and formaldehyde, the condensate containing about 66.5 weight percent of a polycycloaromatic polyamine having the general structure

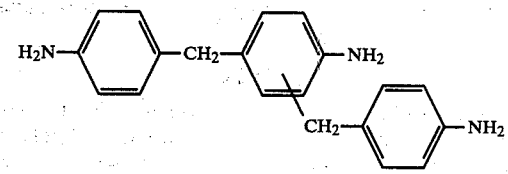

and about 17.4 weight percent of a polycycloaromatic polyamine having the general structure

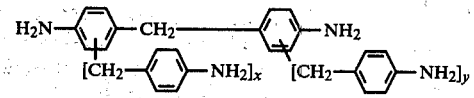

and the sum of x+y is 2, 200 cc of dioxane, and 5 gm of 5% ruthenium on alumina catalyst. In addition, the condensate contained about 12 weight percent of higher amine constituents and about 2.9 weight percent of a diamine constituent. The autoclave was sealed, pressured to 2300 psi with hydrogen gas and heated to 150° C. After 13 hours hydrogen absorption was complete. On cooling, the reaction mixture was filtered from the catalyst and the dioxane was removed by evaporation. The hydrogenated aniline-methyldianiline-formaldehyde condensate was a clear yellow liquid present in better than 90% yield. This mixture was characterized by mass spectra, infrared spectra and proton nuclear magnetic resource spectra. Such spectra indicated the formation of a mixture of polycycloaliphatic polyamines represented structurally as

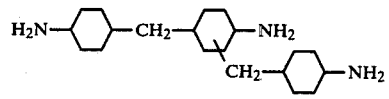

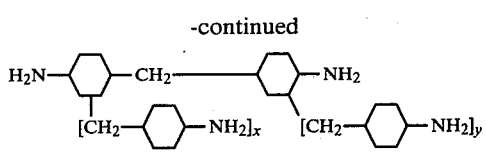

wherein the sum of x+y was 2.

EXAMPLE 2

To 100 parts of epoxy resin based on diglycidyl ether of bisphenol A,

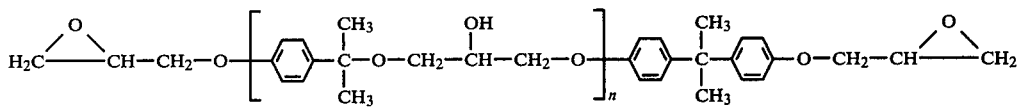

(n=0.2, WPE=185–195) was added, 35 parts of hydrogenate aniline-methyldiamine-formaldehyde condensate, e.g. the mixture of polycycloaliphatic polyamines of Example I. After mixing thoroughly for 2 minutes and centrifuging for 3 minutes, the resin mixture was cured in the aluminum mold at 80° C. for two hours followed by 150° C. for another two hours. The glass transition temperature of the cured product measured with differential scanning colorimeter (Perkin Elmer Model DSC-2) at the heating rate of 20 degree/minutes was about 169° C. n=repeating unit; WPE=weight per expoxide

EXAMPLE 3

20 parts of the hydrogenate aniline-methyldiamine-formaldehyde condensate, e.g. the mixture of polycycloaliphatic polyamines of Example 1 is mixed with 80 parts of 1,2-diaminocyclohexane to formulate an amine blend. 19 parts of the amine blend was introduced to 100 parts of epoxy resin (Example 2) and the resin mixture was mixed thoroughly. After degassing, the resin mixture was placed in the aluminum mold and cured for 2 hours at 80° C. and for another 2 hours at 150° C. The crosslinked product had a glass transition temperature as measured with a differential scanning colorimeter (Perkin Elmer Model DSC-2) of about 161° C.

The glass transition temperature of the cured resin product using 19 parts 1,2-diaminocyclohexane alone, as the epoxy curing agent, was found to be about 150° C.

Thus, the above clearly indicated the improved glass transition temperature of a cured epoxy resin using, as a part of the curing agent, the polycycloaliphatic polyamines of the present invention.

Having thus described the invention, we claim:

1. A method for improving the resinifying properties of epoxy curing agents which comprises incorporating into the epoxy curing agent, prior to admixing same with a polyepoxide resin, from about 5 to about 90 weight percent of a polycycloaliphatic polyamine having the general structure

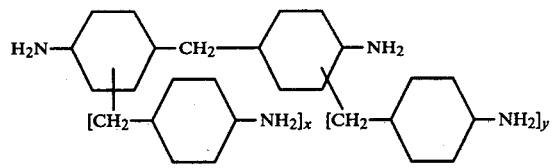

wherein x and y are integers of from 0 to about 2 and the sum of the integers, x+y, is at least 1.

2. The method of claim 1 wherein said polycycloaliphatic polyamine is employed in an amount of from about 10 to about 80 weight percent.

3. The method of claim 2 wherein said polycycloaliphatic polyamine is a mixture of polycycloaliphatic polyamines consisting essentially of from about 50 to about 75 weight percent of a polycycloaliphatic polyamine having the general structure

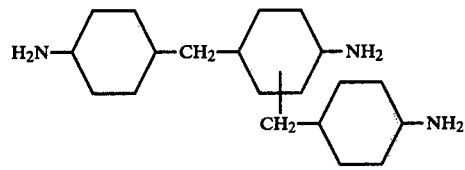

and from about 15 to about 30 weight percent of a polycycloaliphatic polyamine having the general structure

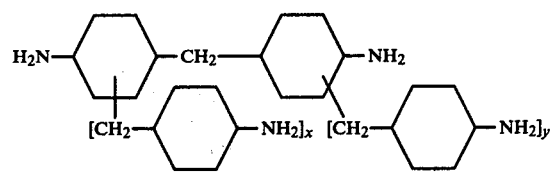

wherein x and y are integers of from 0 to about 2 and the sum of such integers, x+y, is 2.

* * * * *

REEXAMINATION CERTIFICATE (2072nd)

United States Patent [19]

Kluger et al.

[11] B1 4,321,353

[45] Certificate Issued Aug. 3, 1993

[54] POLYCYCLOALIPHATIC POLYAMINES

[75] Inventors: Edward W. Kluger, Pauline; Tien K. Su, Spartanburg, both of S.C.

[73] Assignee: Milliken Research Corporation, Spartanburg, S.C.

Reexamination Request:
No. 90/002,452, Sep. 18, 1991

Reexamination Certificate for:
Patent No.: 4,321,353
Issued: Mar. 23, 1982
Appl. No.: 153,645
Filed: May 27, 1980

Related U.S. Application Data

[62] Division of Ser. No. 850,502, Nov. 10, 1977, Pat. No. 4,226,737.

[51] Int. Cl.⁵ ............................................. C08G 59/50
[52] U.S. Cl. .................................... 528/120; 528/119; 528/122; 528/123
[58] Field of Search ........................ 528/120, 122, 123

[56] References Cited

U.S. PATENT DOCUMENTS

| | | | |
|---|---|---|---|
| 2,817,644 | 12/1957 | Shokal et al. | 260/47 |
| 2,935,488 | 5/1960 | Phillips et al. | 260/45.4 |
| 2,981,711 | 4/1961 | Meyer et al. | 260/31.2 |
| 3,362,979 | 1/1968 | Bentley | 560/354 |
| 3,654,370 | 4/1972 | Yeakey et al. | 260/584 B |
| 3,676,495 | 7/1972 | Hoeschele | 260/563 B |
| 3,711,447 | 1/1973 | Fester et al. | 260/563 R |
| 3,714,120 | 1/1973 | Labana et al. | 528/120 |
| 3,856,862 | 12/1974 | Chung | 260/563 D |
| 3,914,307 | 10/1975 | Massie | 260/563 B |
| 3,945,953 | 3/1976 | Zondler | 260/2 N |
| 3,954,650 | 5/1976 | Bliss | 252/182 |
| 3,959,374 | 5/1976 | Brennan | 260/563 B |
| 4,026,858 | 5/1977 | Andrews | 260/30.2 |
| 4,101,459 | 7/1978 | Andrews | 260/18 EP |
| 4,122,069 | 10/1978 | Meyer | 528/93 |

FOREIGN PATENT DOCUMENTS

1536808 12/1978 United Kingdom .

*Primary Examiner*—Ralph H. Dean, Jr.

[57] ABSTRACT

Novel polycycloaliphatic polyamines are provided which have the structure

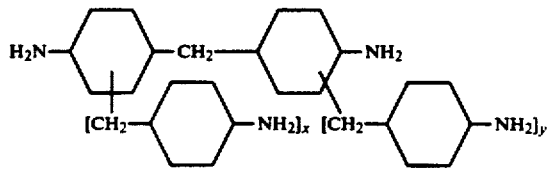

wherein x and y are integers from 0 to about 2 and the sum of x+y is at least 1. Further, polycycloaliphatic polyamine curing agents for polyepoxide resins are provided wherein such curing agents are a reaction mixture consisting essentially of from about 50 to about 75 weight percent of a polycycloaliphatic polyamine represented by the structure

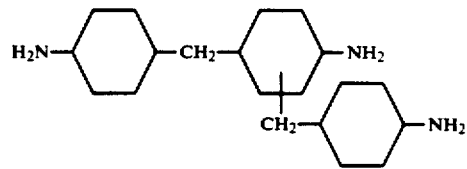

and from about 15 to about 30 weight percent of a polycycloaliphatic polyamine represented by the structure

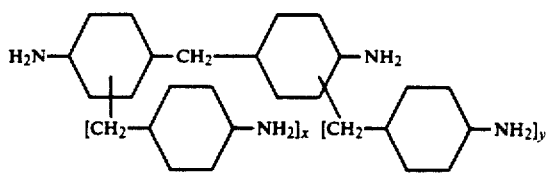

wherein x and y are integers of from 0 to about 2 and the sum of x+y is 2.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 having been finally determined to be unpatentable, are cancelled.

* * * * *